(12) United States Patent
McCulloch

(10) Patent No.: US 6,390,404 B2
(45) Date of Patent: May 21, 2002

(54) SEAT BELT RETRACTOR

(75) Inventor: James Joseph McCulloch, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/799,597

(22) Filed: Mar. 7, 2001

Related U.S. Application Data

(62) Division of application No. 09/432,557, filed on Nov. 3, 1999, now Pat. No. 6,256,848.

(30) Foreign Application Priority Data

Mar. 31, 1999 (GB) .............................................. 9907449

(51) Int. Cl.$^7$ ......................... B60R 22/34; B65H 75/48
(52) U.S. Cl. ................................... 242/375; 242/375.2
(58) Field of Search ............................ 242/375, 375.2, 242/376

(56) References Cited

U.S. PATENT DOCUMENTS

| | | | | |
|---|---|---|---|---|
| 384,742 A | * | 6/1888 | Bradford | 242/375 |
| 681,864 A | * | 9/1901 | Wallace et al. | 242/375 |
| 4,008,863 A | * | 2/1977 | Fohl | 242/376 |
| 4,159,809 A | * | 7/1979 | Rawson | 242/375.2 |
| 4,254,921 A | * | 3/1981 | Adomeit | 242/376 |
| 4,305,554 A | * | 12/1981 | Anderson | 242/376 |
| 4,995,567 A | * | 2/1991 | Ballet | 242/375.2 |
| 5,755,393 A | * | 5/1998 | Frei et al. | 242/375.2 |
| 6,202,957 B1 | * | 3/2001 | Bannert et al | 242/376 |

FOREIGN PATENT DOCUMENTS

| | | |
|---|---|---|
| EP | 0140553 | 5/1985 |
| GB | 1232856 | 5/1971 |
| GB | 1418373 | 12/1975 |
| GB | 2076635 | 12/1981 |
| GB | 2265076 | 9/1993 |
| GB | 2302682 | 1/1997 |

* cited by examiner

*Primary Examiner*—John M. Jillions
(74) *Attorney, Agent, or Firm*—Lonnie Drayer; Jarett Rieger

(57) ABSTRACT

A rewind spring in a cassette for a seat belt retractor is assembled by first placing a mechanism cover on a winding jig. An arbor is fitted to a winding shaft of the jig. One end of a coiled metal bank spring is then fixed to the spring arbor. The band is then wound onto the arbor in the mechanism cover and a spring cover is fitted to the mechanism cover. Finally, a locking clip is attached to the spring cover to lock the arbor against rotation. A spring arbor for use in the cassette has a generally cylindrical shape and an axially extending slot for receiving an end of the spring. A step is provided in the profile of the cylindrical outer surface of the arbor in the region of the slot to compensate for the thickness of the band wound thereon.

4 Claims, 5 Drawing Sheets

PRIOR ART

SEAT BELT RETRACTOR

This application is a divisional application of application Ser. No. 09/432,557, filed Nov. 3, 1999, now U.S. Pat. No. 6,256,848.

FIELD OF THE INVENTION

The present invention relates to a seat belt retractor and particularly to a rewind spring for such a retractor and a method for assembling a rewind spring.

BACKGROUND OF THE INVENTION

In general, a seat belt system has a seat belt retractor. The seat belt retractor has a webbing spool for winding up the seat belt webbing. The webbing spool is constantly biased in the direction for winding up the webbing by a relatively small biasing force. The biasing force prevents the webbing from protracting without the application of a relatively small pulling force. Thus, tension is always applied to the webbing of the seat belt.

A rewind spring in a retractor serves to keep tension on the seat belt webbing by biasing the rotatable spool on which the webbing is wound in a webbing retracted direction. The rewind spring is traditionally in the form of a metal band, preferably a steel band, fixed at one end to an arbor at the axis of the spool and secured at its other end to a fixing point on the spring housing. The band is generally of the form used for clock springs. The band is inserted into the housing by a reverse winding process to provide the requisite tension.

A method of assembling a rewind spring into a retractor currently entails several process steps. In general a coiled metal band is mounted on an unwinding post on a purpose built jig and the end of the band is placed on the winding shaft. A winding apparatus is then lowered over the jig to reverse wind the band onto the jig. When the band is fully reverse wound then the winding apparatus is lifted and a plastic retractor mechanism cover is inserted over and fitted to the reverse wound band. The mechanism cover is then attached to a spring cover, a spring arbor is fixed to the spring and the spring is wound up to tension the spool in the webbing retracted direction. Obviously this is generally lengthy and thus expensive procedure. It is desirable to reduce the number of production steps so as to decrease time and costs.

DISCUSSION OF THE PRIOR ART

UK Patent Application 2076635 A teaches an apparatus a seat belt retractor spring assembly, which includes a casing, a shaft, and a spiral spring. This patent application does not teach or suggest a simpler method for assembling a rewind spring in a cassette.

U.S. Pat. No. 4,995,567 teaches an apparatus for a spiral spring of a retractor comprising a male and female complementary elements which are intended to be engaged with one another and the male elements are fragile and are intended to break as a result of the action exerted upon the hub through the orifice, once the spring has been tensioned. This patent does not teach or suggest a simpler method for assembling a rewind spring in a cassette.

UK Patent Application 2265076 A teaches a device for maintaining a biasing force during assembly of a seat belt retractor. This patent does not teach or suggest a simpler method for assembling a rewind spring.

SUMMARY OF THE INVENTION

According to one aspect of the present invention there is provided a method of assembling a rewind spring in a cassette for a seat belt retractor, the method comprising: taking a coiled metal band, placing the band on an unwinding post on a jig, placing a mechanism housing on the jig at a position spaced from the unwinding post, fixing one end of the band to a spring arbor, using a winding machine to reverse wind the band onto the arbor, fitting a spring cover to the mechanism cover, and attaching a locking clip to the spring cover to lock the arbor against rotation.

According to a second aspect of the invention there is provided a spring arbor for use in the method of the first aspect, the arbor having a generally cylindrical shape and an axially extending slot for receiving an end of the spring, wherein a step is provided in the profile of the cylindrical outer surface of the arbor in the region of the slot to compensate for the thickness of the band being wound thereon and thereby to prevent interleaf gaps between successive turns of the spring band.

Preferably the step is of a height corresponding to the thickness of the band. In a preferred embodiment the arbor has a hole extending at least partly, and preferably fully, through its axis. This hole locates the arbor on the rewinding apparatus used in the method of the first aspect of the invention. It is advantageously shaped with a non-circular profile, for example with a hexagonal profile or another suitable torx transferring shape.

According to a third aspect of the invention there is provided a locking clip for locking the spring arbor against rotation, and particularly against rotation relative to the spring cover, the clip comprising a pin having an outer profile complimentary to the inner profile of the arbor.

The clip is preferably removable and reusable. Thus additional costs are saved. It is advantageously attached to a transversely extending member with fixing means, preferably at each end, to attach the clip to the spring cover. A tab is preferably provided for levering the clip out of engagement with the cover and the spring arbor when it is desired to remove it.

In a particularly advantageous development the clip has a different color or a distinctive marking so that it is easily recognizable by a machine operator or technician and so that it is easily noted that it is in place, and thus that the spring is pre-wound. For example the clip could be formed of brightly colored plastics material.

BRIEF DESCRIPTION OF THE DRAWINGS

For a better understanding of the present invention and to show how the same may be carried into effect, reference will now be made, by way of example, to the accompanying drawings in which.

DETAILED DESCRIPTION OF THE INVENTION

Figure 1:
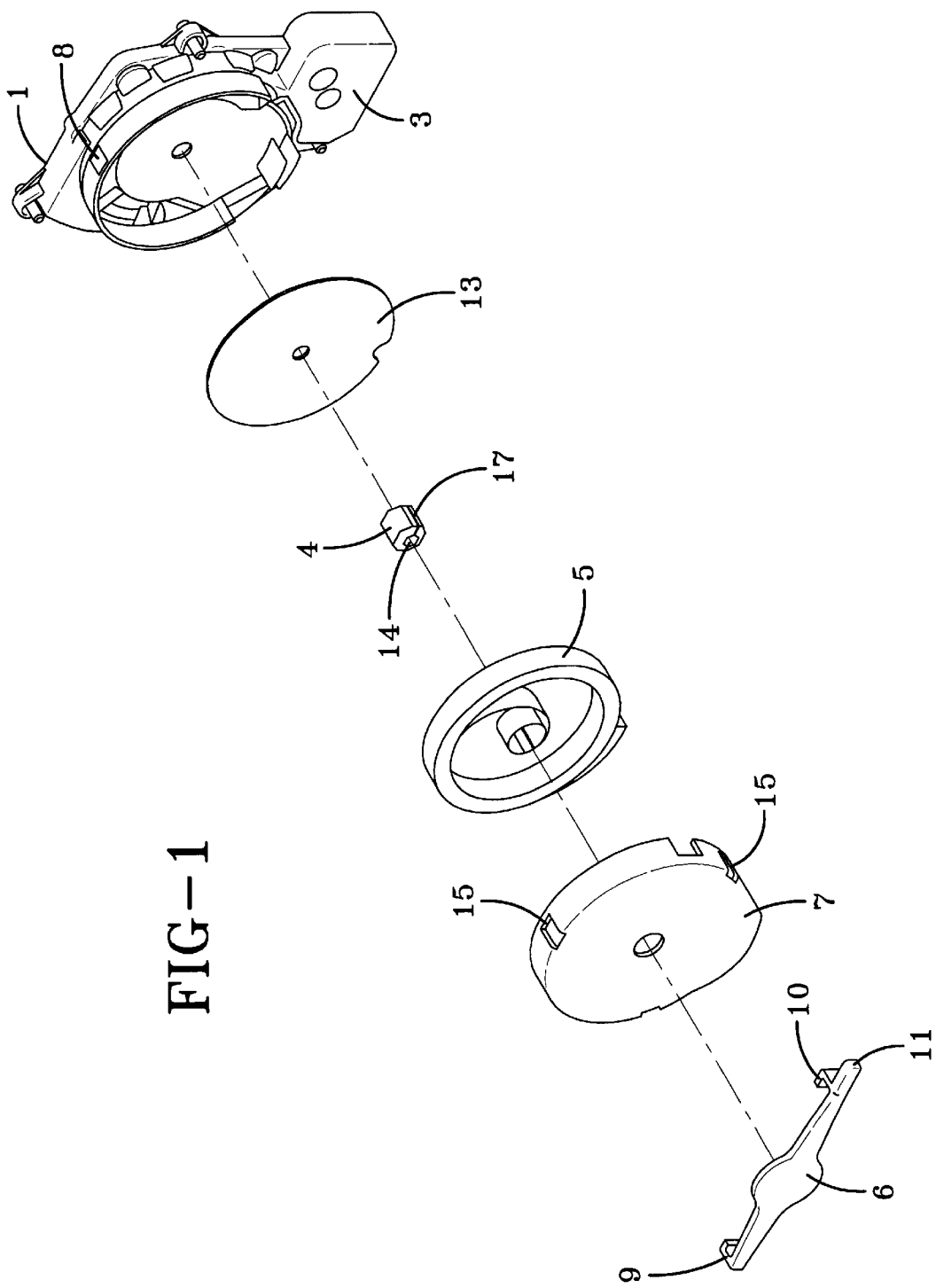
FIG. 1 is an exploded view of part of a seat belt retractor, specifically a pre-wound retraction spring cassette, as assembled by the method of the first aspect of the invention.
Figure 3:
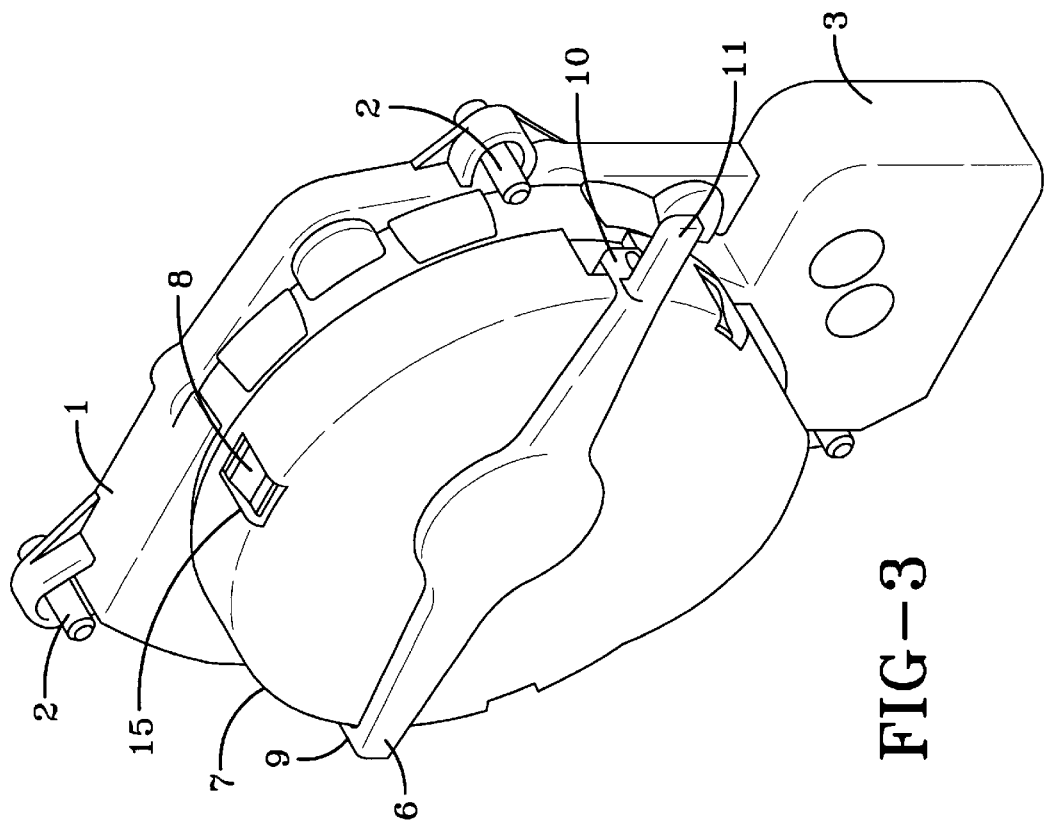
FIG. 3 is a perspective view, from the side and the front, of the cassette of FIG. 1 showing the locking clip of the third aspect of the invention.
Figure 2:
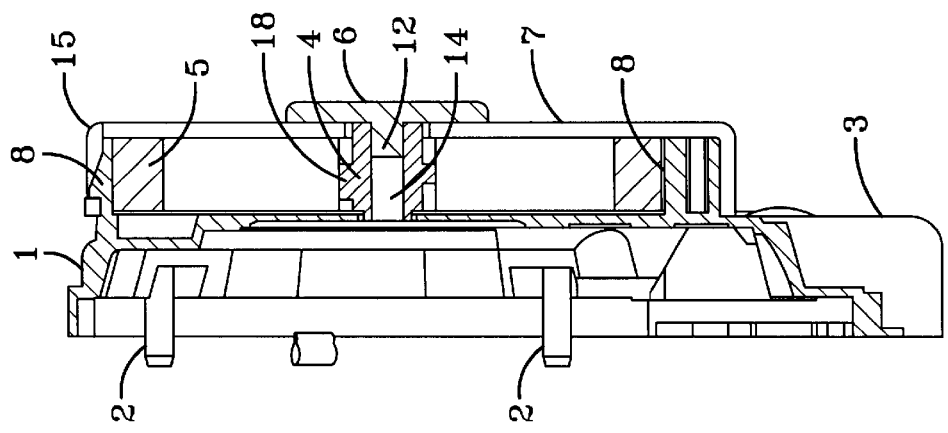
FIG. 2 is a cross-sectional view of the retraction spring cassette of FIG. 1.

FIGS. 1 to 3 show a retraction spring cassette which forms part of a seat belt retractor and which fits on the end of a webbing spool of a seat belt retractor at what is known, to persons skilled in the art, as the mechanism side.

The retraction spring cassette comprises a mechanism cover 1 that fits over the end of the retractor, i.e. over one end of a retractable spool carrying seat belt webbing (not shown). The mechanism cover 1 has spaced fixing rivets 2 and an extended portion 3 at its lower right hand corner (in this example). This extended portion 3 houses a vehicle sensor responsive to sudden acceleration or deceleration, indicative of a crash situation. This is achieved in a manner well known to the person skilled in the field, for example by means of an inertial sensor such as that which is known by the term "standing man" or such as is operated by a ball resting in a cup.

A spring arbor 4 is disposed generally centrally of the spool and connects with the axis of the spool (not shown). A rewind spring 5 has one end attached to the arbor and has the other end connected to the mechanism cover 1. In the assembled cassette this spring 5 is pre-wound on the arbor 4 which is connected to the rotation axis of the retractor spool (not shown). The arbor 4 has a generally cylindrical shape and an axially extending slot 17 for receiving an end of the spring 5, wherein a step 18 is provided in the profile of the cylindrical outer surface of the arbor in the region of the slot to compensate for the thickness of the band being wound thereon. A shim 13 is loosely fitted inside the mechanism cover 1 to reduce the effect of friction between the spring 5 and the mechanism cover 1.

A spring cover 7 fits onto the mechanism cover 1 and is held by snap-fit connectors 8 on the mechanism cover 1 resiliently engaging in corresponding holes 15 around the edge of the spring cover 7.

The spring is locked into the pre-wound state by a key 6 which has a profiled extension 12 which engagingly fits into a generally central hole 14 in the arbor 4. The key 6 also engagingly fits over the sides of the spring cover 7 by means of extension legs 9 and 10. An arm 11 extends away from the side of the spring cover 7 and allows the key 6 to be easily levered manually off the cover 7 when the cassette has been satisfactorily attached to a retractor spool and the seat belt webbing inserted.

Figure 4A:
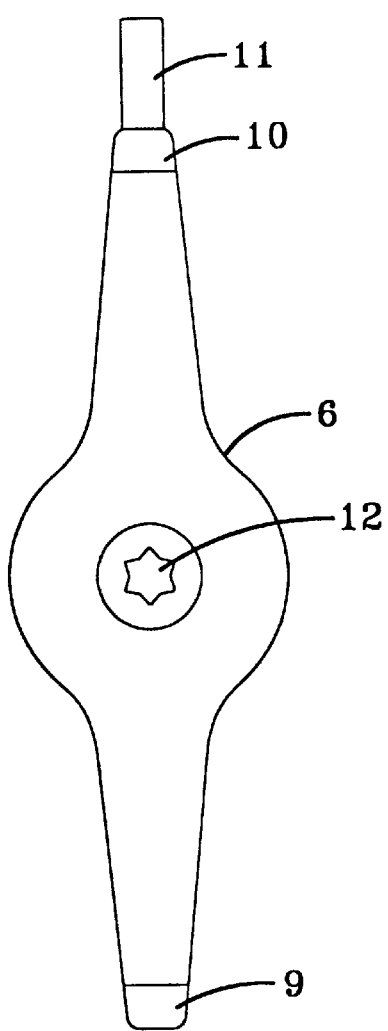
FIGS. 4A, 4B and 4C show the locking clip in more detail in front, side and perspective views respectively.
Figure 4B:
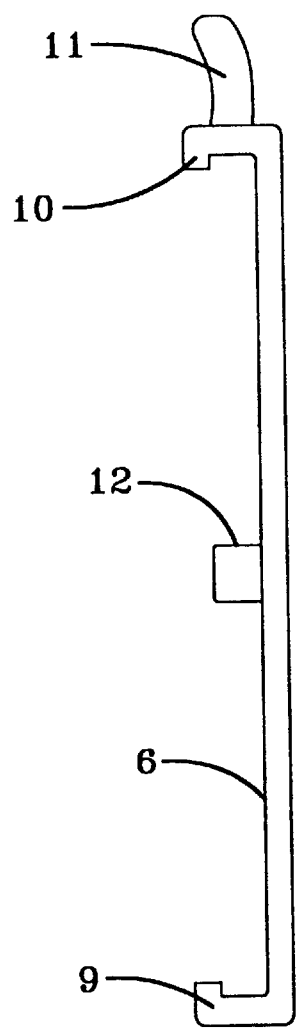
Figure 4C:
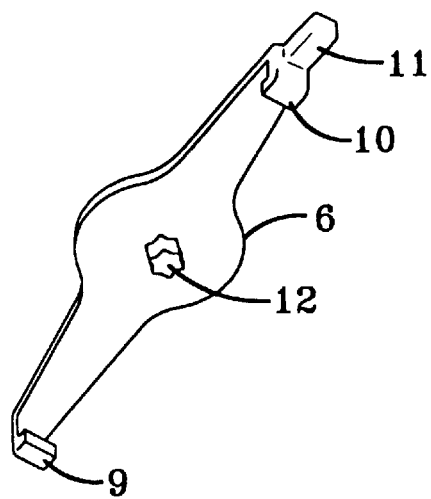

FIGS. 4a to 4c show the key 6 in more detail in front, side and perspective views. The locking extension 12 provides a torx profile and has a generally hexagonal profile and the central hole 14 in the spring arbor 4 has a corresponding complimentary profile so that when the key 6 is engaged the spring arbor 4 cannot turn and the spring is locked in the pre-wound state.

Figure 5A:
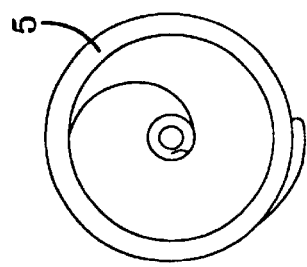
FIGS. 5A to 5F illustrate a retraction spring cassette assembly method according to the prior art; and, FIGS. 6A to 6D illustrate a retraction spring cassette assembly method according to the first aspect of the invention.
Figure 5B:
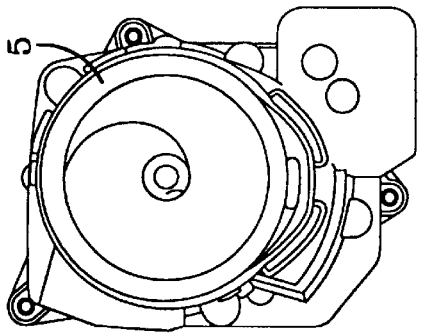
Figure 5C:
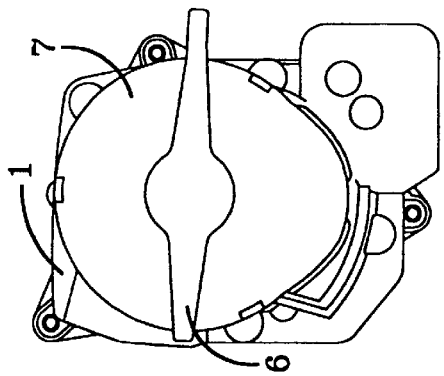
Figure 5D:
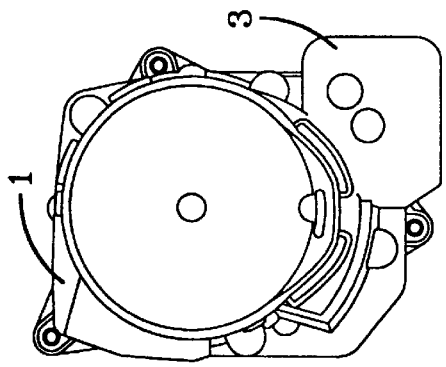

In FIGS. 5A through 5F a known method of assembling a spring cassette is illustrated. This method comprises many steps. First, in FIG. 5A, the coiled retraction spring 5 is placed onto a winding post on a jig and wound on using a winding tool. The shim 13 is placed into the mechanism cover 1 as shown in FIG. 5B and the mechanism cover 1 is fitted over the spring 5 on the jig (FIG. 5C). This sub-assembly is then removed from the jig (and may be placed in a storage box).

Figure 5E:
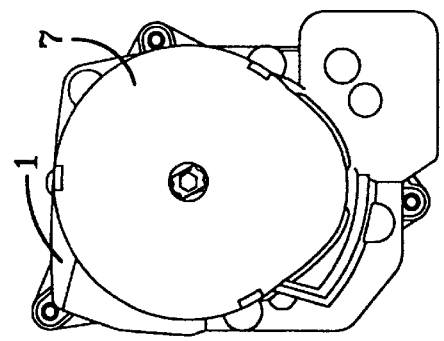
Figure 5F:
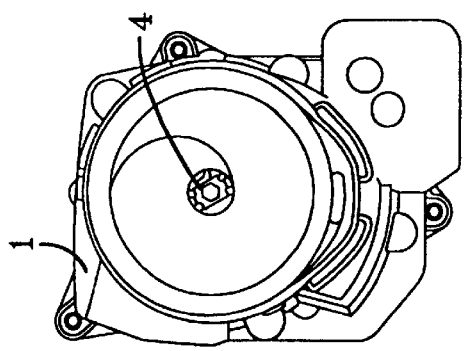

Subsequently the spring arbor 4 is fitted to the spring center of the sub-assembly (FIG. 5D) and the spring cover 7 is fitted over the mechanism cover 1 (FIG. 5E). Traditionally the sub-assembly is again removed for storage at this stage. The final steps of assembly comprise fitting the sub-assembly back on the winding jig, locating the arbor splines to the winding shaft, winding the spring a specified number of turns (usually two) and fitting a pre-wind locking clip 6 (FIG. 5F). The cassette is now ready for shipment to customers to fit onto a retractor.

Figure 6B:
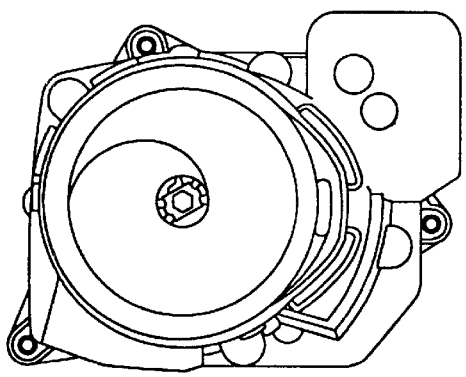
Figure 6D:
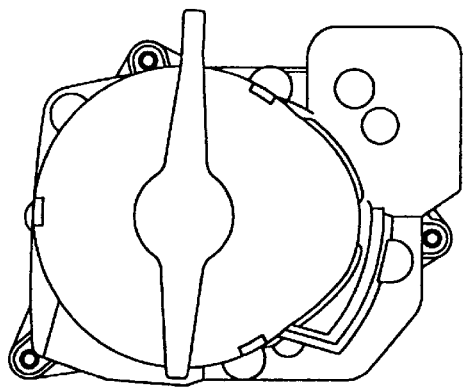
Figure 6A:
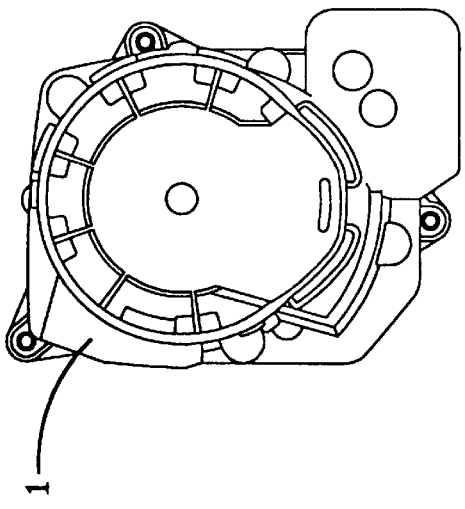
Figure 6C:
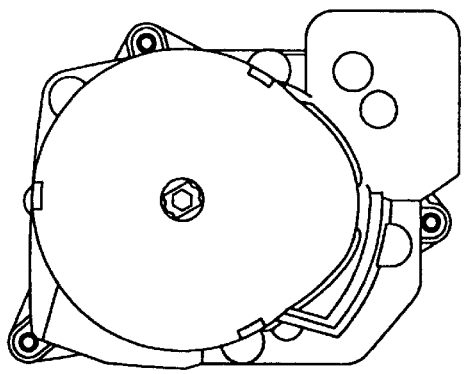

FIGS. 6A through 6D illustrate the improved and shortened method of the present invention. The mechanism cover 1 is first fitted onto the winding post of the jig (FIG. 6A). The shim 13 is placed into the mechanism cover 1 and the arbor 4 is fitted onto the winding shaft. The coiled spring 5 is then placed onto the unwinding post of the jig and the end of the spring is located in the arbor 4. Then the spring 5 is wound into the mechanism cover 1 and the spring cover 7 snap-fitted over the mechanism cover 1. The spring 5 is then wound the specified number of turns (e.g. two). Finally the locking key 6 is fitted and the cassette is ready for the customer.

The method of the invention has considerable advantages in that it allows the retraction spring to be pre-wound in effectively a single operation and reduces line time in the plant.

Many changes and modifications in the above-described embodiments of the invention can, of course, be carried out without departing from the scope thereof. Accordingly, that scope is intended to be limited only by the scope of the appended claims.

I claim:

1. A spring arbor comprising a member with a generally cylindrical shape, an axially extending slot for receiving an end of a metal coiled band, and a step is provided in the profile of the cylindrical outer surface of the arbor in the region of the slot to compensate for a thickness of the metal coiled band being wound thereon, wherein the step is of a height corresponding to the thickness of the metal coiled band.

2. The spring arbor according to claim 1 wherein the arbor has a hole extending at least partly through its axis to locate the arbor on a winding shaft.

3. The spring arbor according to claim 2 wherein the hole is shaped with a non-circular torx bearing profile.

4. The spring arbor according to claim 3 wherein the hole has a hexagonal profile.

* * * * *